(12) United States Patent
Sundaram et al.

(10) Patent No.: US 10,031,851 B2
(45) Date of Patent: *Jul. 24, 2018

(54) ADDRESS RE-ORDERING MECHANISM FOR EFFICIENT PRE-FETCH TRAINING IN AN OUT-OF ORDER PROCESSOR

(71) Applicant: Samsung Electronics Co., Ltd., Suwon-si, Gyeonggi-Do (KR)

(72) Inventors: Karthik Sundaram, Austin, TX (US); Arun Radhakrishnan, Austin, TX (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/401,515

(22) Filed: Jan. 9, 2017

(65) Prior Publication Data

US 2017/0116128 A1 Apr. 27, 2017

Related U.S. Application Data

(63) Continuation of application No. 14/498,878, filed on Sep. 26, 2014, now Pat. No. 9,542,323.

(60) Provisional application No. 61/972,009, filed on Mar. 28, 2014.

(51) Int. Cl.
| | | |
|---|---|---|
| *G06F 12/00* | (2006.01) | |
| *G06F 12/0862* | (2016.01) | |
| *G06F 12/0875* | (2016.01) | |
| *G06F 12/1027* | (2016.01) | |

(52) U.S. Cl.
CPC ...... *G06F 12/0862* (2013.01); *G06F 12/0875* (2013.01); *G06F 12/1027* (2013.01); *G06F 2212/452* (2013.01); *G06F 2212/6028* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 6,085,302 | A | 7/2000 | Mahalingaiah et al. |
| 6,311,260 | B1 | 10/2001 | Stone et al. |
| 6,381,689 | B2 | 4/2002 | Witt et al. |
| 7,383,418 | B2 | 6/2008 | Janik et al. |
| 2006/0047915 | A1 | 3/2006 | Janik et al. |
| 2010/0138630 | A1 | 6/2010 | Persson et al. |
| 2012/0072674 | A1 | 3/2012 | Pierson et al. |
| 2012/0124586 | A1 | 5/2012 | Hopper et al. |

*Primary Examiner* — Brian Peugh
(74) *Attorney, Agent, or Firm* — Perspectives Law Group, Corp.

(57) ABSTRACT

A computing system includes: an instruction dispatch module module configured to receive a program instruction; and an address reordering module, coupled to the instruction dispatch module, configured to filter the program instruction when the program instruction is a hit in a cache-line in a prefetch filter. The computer system further includes: an instruction dispatch module configured to receive a program instruction; an address reordering module, coupled to the instruction dispatch module, configured to: allocate a tag in a tag module for the program instruction in a program order, allocate a virtual address in a virtual address module for the program instruction and out-of-order relative to the program order, and insert a pointer associated with the tag to link the tag to the virtual address.

18 Claims, 6 Drawing Sheets

ADDRESS RE-ORDERING MECHANISM FOR EFFICIENT PRE-FETCH TRAINING IN AN OUT-OF ORDER PROCESSOR

CROSS-REFERENCE TO RELATED APPLICATION(S)

This application is a Continuation of co-pending U.S. patent application Ser. No. 14/498,878 filed Sep. 26, 2014, and the subject matter thereof is incorporated herein by reference thereto. U.S. patent application Ser. No. 14/498,878 filed Sep. 26, 2014, further claims the benefit of U.S. Provisional Patent Application Ser. No. 61/972,009 filed Mar. 28, 2014, and the subject matter thereof is incorporated herein by reference thereto.

TECHNICAL FIELD

An embodiment of the present invention relates generally to a computing system, and more particularly to a system for prefetch.

BACKGROUND

Modern consumer and industrial electronics, such as computing systems, servers, appliances, televisions, cellular phones, automobiles, satellites, and combination devices, are providing increasing levels of functionality to support modern life. While the performance requirements can differ between consumer products and enterprise or commercial products, there is a common need for more performance while reducing power consumption.

Research and development in the existing technologies can take a myriad of different directions. Caching is one mechanism employed to improve performance. Prefetching is another mechanism used to help populate the cache. However, prefetching is costly in memory cycle and power consumption.

Thus, a need still remains for a computing system with prefetch mechanism for improved processing performance while reducing power consumption through increased efficiency. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an apparatus, including: an instruction dispatch module configured to receive a program instruction; and an address reordering module, coupled to the instruction dispatch module, configured to filter the program instruction when the program instruction is a hit in a cache-line in a prefetch filter.

An embodiment of the present invention provides an apparatus, including: an instruction dispatch module configured to receive a program instruction; an address reordering module, coupled to the instruction dispatch module, configured to: allocate a tag in a tag module for the program instruction in a program order, allocate a virtual address in a virtual address module for the program instruction and out-of-order relative to the program order, and insert a pointer associated with the tag to link the tag to the virtual address An embodiment of the present invention provides a method including: receiving a program instruction; and filtering the program instruction when the program instruction is a hit in a cache-line in a prefetch filter.

An embodiment of the present invention provides a method including: receiving a program instruction; allocating a tag in a tag module for the program instruction in a program order; allocating a virtual address in a virtual address module for the program instruction and out-of-order relative to the program order; and inserting a pointer associated with the tag to link the tag to the virtual address.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Various embodiments provide the address reordering module to filter out multiple or repeated accesses to the same cache-line and can enable the prefetch module to train on unique cache-line accesses, resulting in the computing system being more efficient, such as improved processing performance and lower power consumption.

Various embodiments provide the ability to reconstruct the virtual addresses for the program instructions in program order, even during out-of-order execution. Each program instruction is associated with a unique tag and the pointer that relates a specific tag to a location or entry for the virtual address associated with that specific program instruction, the specific tag, or a combination thereof. The tags are in program order, allowing any virtual address delivered to the prefetch module to be reconstructed so as to be in program order.

Various embodiments filter out the virtual addresses that are hits in the cache module. The hit-miss status(es) from the cache module are stored as the hit-miss indicators with the virtual address for a particular program instruction, or as a more specific example, a data load or memory access instruction. If the hit-miss indicator provides a hit status, then the virtual address associated with the hit is not sent to the prefetch module, and various embodiments can deallocate information for that particular virtual address.

Various embodiments incorporate a mechanism to filter out hits in the cache module from training the prefetch module and to enable the prefetch module to sample the misses in the program order. This can be accomplished with the hit-miss indicator for the virtual address, as described above.

The following embodiments are described in sufficient detail to enable those skilled in the art to make and use the invention. It is to be understood that other embodiments may be evident based on the present disclosure, and that system, process, architectural, or mechanical changes can be made to the example embodiments without departing from the scope of the present invention.

In the following description, numerous specific details are given to provide a thorough understanding of the invention. However, it will be apparent that the invention and various embodiments may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, an embodiment can be operated in any orientation.

The term "module" referred to herein can include software, hardware, or a combination thereof in an embodiment of the present invention in accordance with the context in which the term is used. For example, the software can be machine code, firmware, embedded code, application software, or a combination thereof. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

The modules in the following description of the embodiments can be coupled to one other as described or as shown. The coupling can be direct or indirect without or with, respectively, intervening between coupled items. The coupling can be physical contact or by communication between items.

Figure 1:
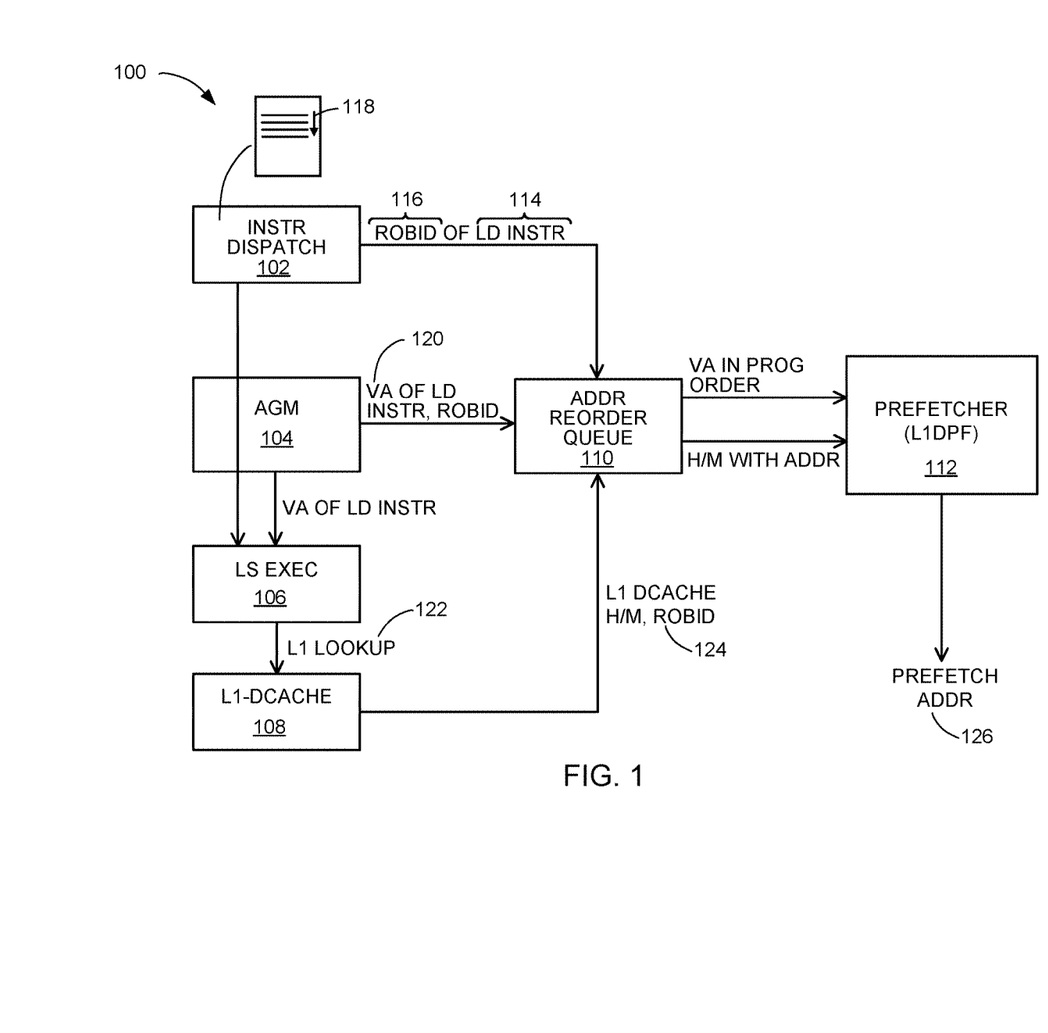
FIG. 1 is a computing system with prefetch mechanism in an embodiment of the present invention.

Referring now to FIG. 1, therein is shown a computing system 100 with prefetch mechanism in an embodiment of the present invention. FIG. 1 depicts a portion of the computing system 100. As an example, FIG. 1 depicts a portion of a computing system 100, such as at least a portion of a processor, a central processing unit (CPU), a graphics processing unit (GPU), a digital signal processor (DSP), or a hardware circuit with computing capability, which can be implemented with an application specific integrated circuit (ASIC). These applications of the computing system 100 can be shown in the examples in FIG. 6 and other portions shown throughout this application.

In further examples, various embodiments can be implemented on a single integrated circuit, with components on a daughter card or system board within a system casing, or distributed from system to system across various network topologies, or a combination thereof. Examples of network topologies include personal area network (PAN), local area network (LAN), storage area network (SAN), metropolitan area network (MAN), wide area network (WAN), or a combination thereof.

As a more specific example, FIG. 1 can depict a prefetch mechanism for the computing system 100. The prefetch mechanism is applicable to a number of memory hierarchies within the computing system 100, external to the computing system 100, or a combination thereof. The memory hierarchies can be organized in a number of ways. For example, the memory hierarchies can be tiered based on access performance, dedicated or shared access, size of memory, internal or external to the device or part of a particular tier in the memory hierarchy, nonvolatility or volatility of the memory devices, or a combination thereof.

As a further example, FIG. 1 can also depict a prefetch mechanism for various types of information or data. For example, FIG. 1 can depict a prefetch mechanism for data access to be used for operation of the computing system 100. Also for example, FIG. 1 can depict a prefetch mechanism for instruction access to be used for operation of the computing system 100. For brevity and without limiting the various embodiments, the computing system 100 will be described with regard to the purpose of data access.

Returning to the illustrations, FIG. 1 depicts an instruction dispatch module 102, an address generation module 104, a load-store execution module 106, a cache module 108, an address reordering module 110, and a prefetch module 112. As noted earlier, these modules can be implemented with software, hardware circuitry, or a combination thereof. The remainder of the FIG. 1 description describes the functionality of the modules but more details about the operation of these modules are described in subsequent figures. Also noted earlier, the computing system 100 is described with regards to the purpose of data access as an example and other portions of the computing system 100 are not shown or described, such as the instruction load, execution, and store.

The instruction dispatch module 102 can retrieve or receive a program instruction 114 from a program store (not shown) containing the program with a program order 118 for execution. The program instruction 114 represents at least one line of executable code for the program. The instruction dispatch module 102 determines whether the program instruction 114 is a load instruction; a load instruction retrieves data that can be used for execution by the computing system 100. For example, the load instruction can be a load operation or a retrieval operation of data.

When the instruction dispatch module 102 determines the program instruction 114 is a load instruction, then this module can allocate and dispatch a tag 116 with the program instruction 114 to the address reordering module 110. The tag 116 enables tracking the program instruction 114 in a program order 118. The tag 116 is unique to and associated with that particular instance of the program instruction 114 being dispatched. In the examples in FIG. 2 and in the following figures, the tag 116 can be referred to as a reorder buffer identification (ROBID). The operation of the instruction dispatch module 102 is described later.

The address generation module 104 generates a virtual address 120 unique to and associated with that particular instance of the program instruction 114, in this example a load instruction or a memory access instruction. The program order 118 is the order in which the program instructions 114 are retrieved by the instruction dispatch module 102. The virtual addresses 120 can be sent in the program order 118 to the prefetch module 112.

The virtual address 120 is associated with the tag 116. The virtual address 120 and the tag 116 can be unique to each other.

The address generation module 104 can send the virtual address 120 to the address reordering module 110. The address generation module 104 can also send the virtual address 120 also to the load-store execution module 106.

Various embodiments of the computing system 100 can operate the instruction dispatch module 102 at different times relative to the operation of the address generation module 104. The operations of these modules can be sequential, synchronous, asynchronous, or a combination thereof to each other. In the example embodiments, the address generation module 104 can operate after and asynchronously from the instruction dispatch module 102. In other words, the address generation module 104 can operate on the program instruction 114 associated with the tag 116 in an order different than the program order 118 or out of order.

The load-store execution module 106 performs the program instruction 114 associated with the tag 116, the virtual address 120, or a combination thereof, as illustrated by the arrows from the instruction dispatch module 102 and the address generation module 104. When, as in this example, the program instruction 114 is a load instruction for data, the load-store execution module 106 can invoke a cache look-up 122. The cache look-up 122 can be sent the cache module 108.

The cache module 108 provides a more rapid access to data relative to other memory devices or structures in a memory hierarchy. The cache module 108 can be for data, program instructions, or a combination thereof. In a processor example for the computing system 100, the cache module 108 can include multiple levels of cache memory, such as level one (L1) cache, level 2 (L2) cache, etc. The various levels of cache can be internal to the computing system 100, external to the computing system 100, or a combination thereof.

In an embodiment where the computing system 100 is an integrated circuit processor, the L1 cache can be within the integrated circuit processor and the L2 cache can be off-chip. In the example shown in FIG. 1, the cache module 108 is shown as an L1 data cache or an L1 cache for data and not necessarily for program instructions.

The cache module 108 can provide a hit-miss status 124 for the data being requested by the program instruction 114 (associated with the tag 116 and the virtual address 120). The hit-miss status 124 indicates if the data requested with the virtual address 120 (in this example the load instruction) is in an existing cache-line address in the cache module 108. If it is, the hit-miss status 124 would indicate a hit, otherwise a miss. The cache module 108 can send the hit-miss status 124, the tag 116 of the program instruction 114, or a combination thereof to the address reordering module 110.

The address reordering module 110 reorders the virtual addresses 120 of the program instructions 114, in this example the load instructions or the memory instructions for data access, in the program order 118, post out-of-order generation. The post out-of-order generation refers to the order of the virtual address 120 relative to the tag 116. Because the address generation module 104 does not necessarily operate on the program instruction 114 in the order retrieved by the instruction dispatch module 102, the virtual address 120 can be processed out of order. The out of order processing can be by the address reordering module 110, the load-store execution module 106, or a combination thereof relative to the instruction dispatch module 102. However, the virtual address 120 is still associated with the tag 116 and is still in program order 118. The address reordering module 110 also filters the virtual addresses 120 that are hits in the cache module 108.

It has been discovered that an embodiment and in this specific example, the address reordering module 110 can filter out multiple or repeated accesses to the same cache-line and can enable the prefetch module 112 to train on unique cache-line accesses, resulting in the computing system 100 being more efficient, such as improved processing performance and lower power consumption.

The address reordering module 110 filters out cache hits from training the prefetch module 112 and enables the prefetch module 112 to sample misses for the program instruction 114 (such as a load instruction) in the program order 118. More details about the address reordering module 110 will be described later.

After getting trained with the virtual address 120 about the cache misses, the prefetch module 112 attempts to predict the addresses of future accesses and fetches the data associated with these addresses from the next level of memory hierarchy. The prefetch module 112 can retrieves data for cache misses for the program instructions 114. The prefetch module 112 can receive the hit-miss status 124 associated with a particular instance of the virtual address 120 and with the virtual address 120 itself.

Figure 2:
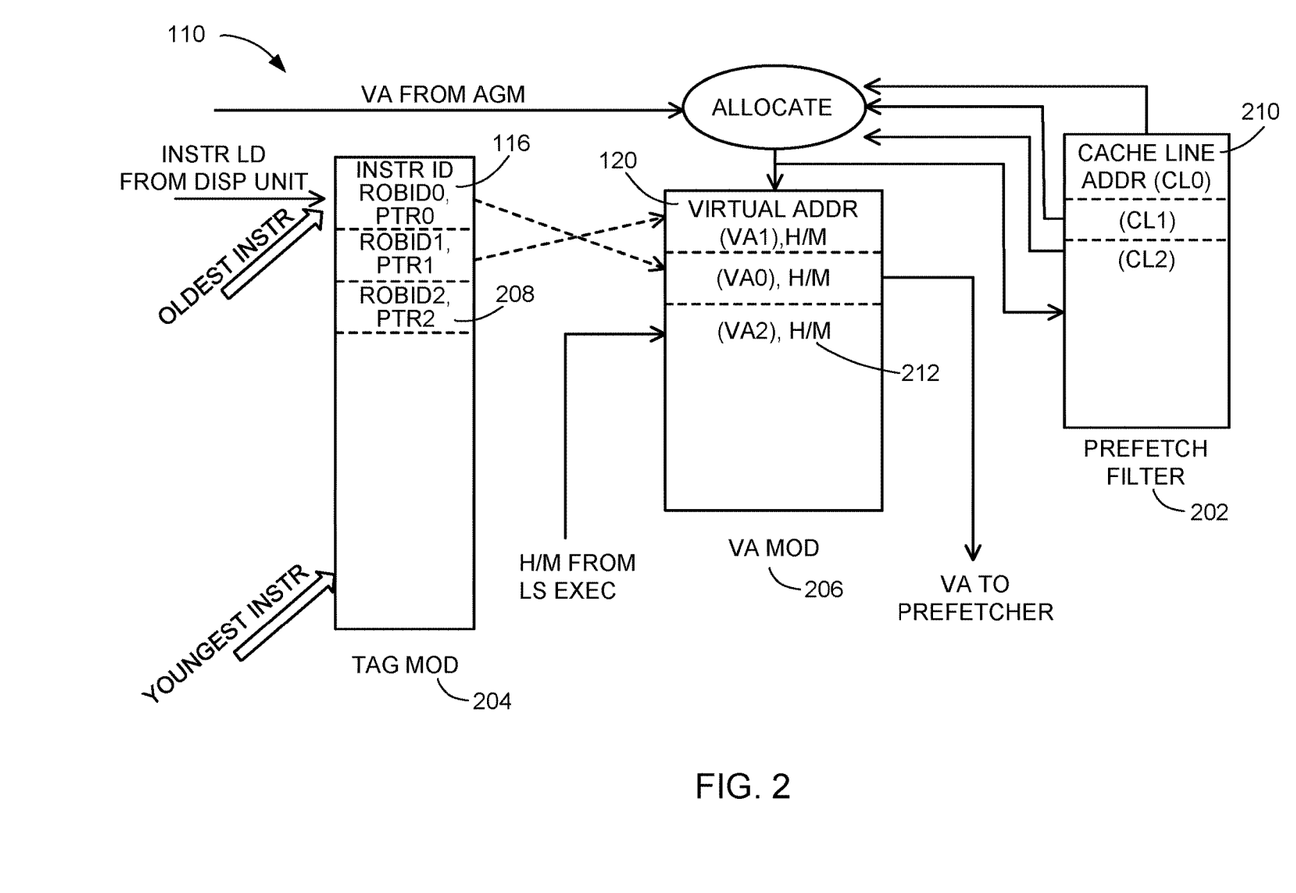
FIG. 2 is an example operational diagram of the address reordering module of FIG. 1.

Referring now to FIG. 2, therein is shown an example operational diagram of the address reordering module 110 of FIG. 1. In an embodiment, FIG. 2 depicts the operation of the address reordering module 110 with the tag 116 of FIG. 1, the virtual address 120 of FIG. 1, and a prefetch filter 202. The address reordering module 110 can provide the virtual address 120 to the prefetch module 112 of FIG. 1 for misses in the cache module 108 of FIG. 1 while filtering out existing cache-line addresses in the prefetch filter 202.

In this example, the address reordering module 110 includes a tag module 204 and a virtual address module 206 along with the prefetch filter 202. The tag module 204 can receive the tag 116 from the instruction dispatch module 102 of FIG. 1. The tag module 204 maintains the tag 116 and a pointer 208 to the virtual address 120, associated with the tag 116, in the virtual address module 206. The virtual address module 206 stores the virtual address 120 for a cache-line 210, and a hit-miss indicator 212.

The tag module 204 can be implemented in a number of ways. In an embodiment, the tag module 204 can be implemented as a queue with the capability of shifting content relative to other contents within the queue and can be referred to as a shifting queue. In a further embodiment, the tag module 204 can be implemented with the functionality of a linked list where the contents in the linked list can be moved, added, or removed through operations to the linked list.

As an example, entries in the tag module 204 can include the tag 116 and the pointer 208. The pointer 208 provides the link for the tag 116 to its associated virtual address 120 in the virtual address module 206. As an example, the pointer 208 refers to the location for the virtual address 120 in the virtual address module 206 associated with tag 116. The pointer 208 can maintain the program order relative to the associated tag 116 in the tag module 204 while the virtual address 120 can be out of order in the virtual address module 206.

The tag module 204 tracks the program order 118 of FIG. 1 for the program instructions 114 associated using each of the tags 116. The tag module 204 can organize the tags 116 and the associated pointers 208 in the program order 118 from oldest to youngest. The program instruction 114 of FIG. 1 is considered oldest if it is the one retrieved earliest by the instruction dispatch module 102 relative to the program order 118 and still remaining in the tag module 204.

The virtual address module 206 can be populated with the virtual address(es) 120 from the address generation module 104 of FIG. 1 in an order different to or out of order from the program order 118 retrieved by the instruction dispatch module 102, as noted earlier. The virtual address module 206 determines whether a particular instance of the virtual address 120 should be included, added or allocated, based on whether the virtual address 120 is in an existing cache-line addresses in the prefetch filter 202. The hit-miss indicator 212 in the virtual address module 206 can be populated with information from the load-store execution module 106 of FIG. 1, the cache module 108, or a combination thereof. Details of the operation of the virtual address module 206 and the hit-miss indicator 212 will be described later.

The virtual address module 206 can be implemented in a number of ways. For example, the virtual address module 206 can be implemented as a queue with the capability of not shifting content within the queue or can be referred to as a non-shifting queue. The non-shifting functionality refers to the contents in the queue not moving in position differently relative to one another while in the queue. In a further embodiment, the virtual address module 206 can be implemented with a functionality for a linked list where the contents in the linked list can be moved, added, or removed through operations to the linked list.

The prefetch filter 202 aides to filter out repeated addresses for prefetch. The prefetch filter 202 can include the virtual addresses 120 that have been previously processed by address generation module 104. The prefetch filter 202 is used to filter out repeated access to the cache-line.

Figure 3:
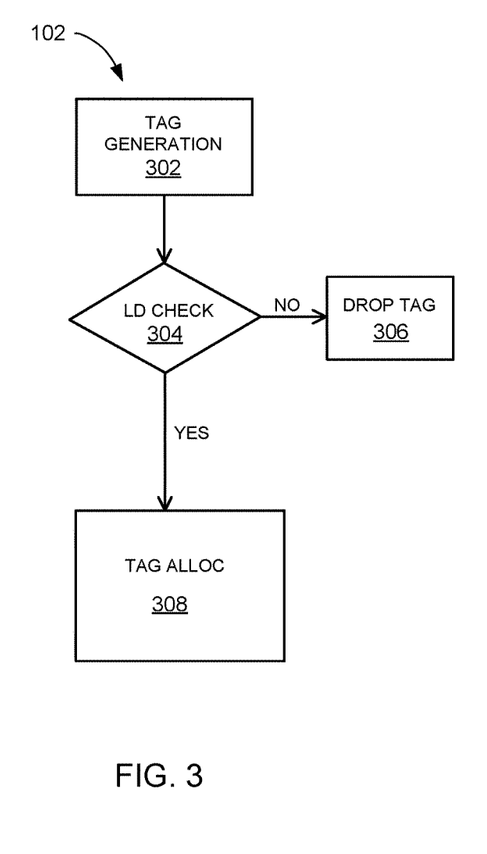
FIG. 3 is a control flow for an instruction dispatch for use with the computing system.

Referring now to FIG. 3, there is shown a control flow for an instruction dispatch for sue with the computing system 100. In an embodiment, FIG. 3 can depict the control flow for the instruction dispatch module 102 of FIG. 1 including a tag generation module 302, an instruction check module 304, a drop tag module 306, and a tag allocation module 308.

In an embodiment, the tag generation module 302 retrieves or receives the program instruction 114 of FIG. 1. The tag generation module 302 also generates the tag 116 of FIG. 1 for that particular instance of the program instruction 114.

The tag 116 can be generated in a number of ways. For example, the tag generation module 302 can provide one or more counters where each count value can represent the value for the tag 116. The counter should be sufficiently large to avoid conflicts or duplicate count values for different instances of the program instructions 114 in the tag module 204 of FIG. 2. As a further example, the tag generation module 302 can provide linear feedback shift registers (LFSR) for a primitive polynomial such that each shift of the LFSR represents a unique value and does not repeat until all possible combinations of values for the number of bits in the LFSR has been exhausted. As in the example of a counter, the LFSR should also be sufficiently large to avoid duplicates in the tag module 204. The flow can progress from the tag generation module 302 to the instruction check module 304.

The instruction check module 304 verifies if the program instruction 114 associated with the tag 116 generated is a load instruction. The instruction check module 304 can perform this verification in a number of ways. For example, the instruction check module 304 can check a predetermined portion of the program instruction 114 to see if it matches the operation code (opcode) for the load instruction. If it does, then the instruction check module 304 determines that the program instruction 114 is a load instruction, otherwise it is not. The matching function can be a logical compare of the bits from the predetermined portion of the program instruction 114 to an expected opcode for the load instruction. There can be more than one instruction for the load instruction possibly requiring the instruction check module 304 to check for a number of opcodes for the various load instructions of interests. As a specific example, the predetermined portion of the program instruction 114 can be a bit or a flag indicating a load instruction (or not).

For illustrative purposes, the instruction check module 304 is described as decoding the program instruction 114 or verifying that the program instruction 114 is for a load instruction, although it is understood that the instruction check module 304 can function differently. For example, the instruction check module 304 can also check for other types of instructions beside memory load instructions. The instruction check module 304 can check for load instructions for specific levels in the memory hierarchy in various embodiments.

Returning to the control flow, if the instruction check module 304 determines the program instruction 114 is not a load instruction, the flow can progress to the drop tag module 306. The drop tag module 306 does not associate the tag 116 with the program instruction 114 if it is not a load instruction.

The drop tag module 306 can free up the tag 116 that was generated for the program instruction 114 by the tag generation module 302 in a number of ways. In an embodiment, the drop tag module 306 can forgo that particular value for the tag 116 and not associated with any program instructions until the tag generation module 302 cycles through and to avoid duplicates, as described earlier. In a further embodiment, the freed up value for the tag 116 can be recycled and be used for the next program instruction 114 processed by the tag generation module 302. The tag 116 can be used to track the relative position of the program instruction 114 in the program order 118.

If the instruction check module 304 determines the program instruction 114 is a load instruction, the flow can progress to the tag allocation module 308. The tag allocation module 308 can insert or allocate the tag 116 into the tag module 204 in the address reordering module 110 of FIG. 1.

The tag allocation module 308 can operate in a number of ways. For example, the tag allocation module 308 can scan the tag module 204 from one end to towards an opposite end. The scanning function from one end can be from the oldest tag 116 for its associated program instruction 114 in the program order 118 of FIG. 1 processed by the instruction dispatch module 102 to the newest tag 116 for its associated program instruction 114. The tag allocation module 308 can insert the tag 116 in the first available location in the tag module 204.

The tag allocation module 308 can scan the tag module 204 in a number of ways. In an embodiment, each entry or location in the tag module 204 can have flag to indicate whether the location is occupied with one of the tags 116 or empty and available to be populated with the tag 116. In a further embodiment, a separate storage can be utilized to maintain the last location where the tag 116 from a previous operation has populated or can maintain the location where the next available location to be populated in the tag module 204.

Figure 4:
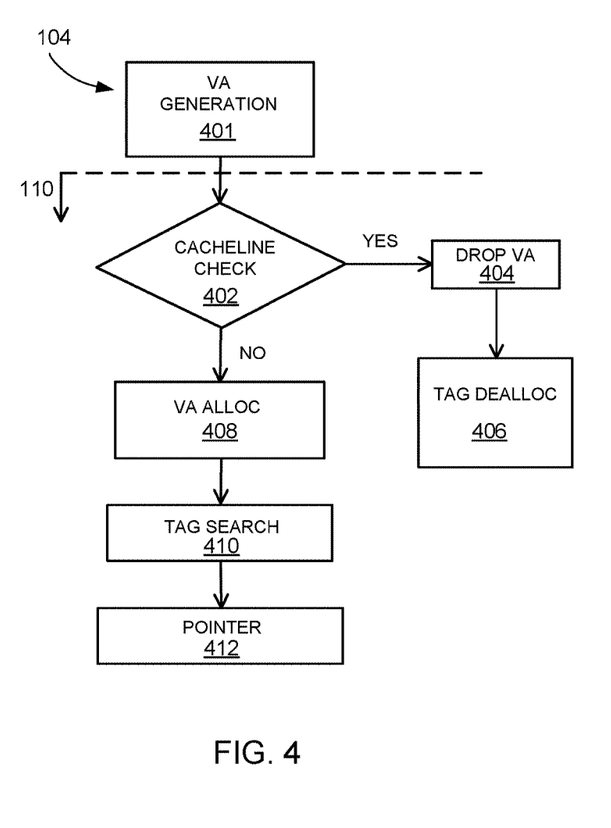
FIG. 4 is a control flow for address generation and reordering for the computing system.

Referring now to FIG. 4, therein is shown a control flow for address generation and reordering for the computing system 100. In an embodiment, FIG. 4 can depict control flow for the address generation module 104 of FIG. 1 and the address reordering module 110 of FIG. 1. The address generation module 104 can include a virtual address generation module 401. The address reordering module 110 can include a cache line check module 402, a drop virtual address module 404, a tag deallocation module 406, a virtual address allocation module 408, a tag search module 410, and a pointer module 412.

The virtual address generation module 401 generates the virtual address 120 of FIG. 1 for the program instruction 114 of FIG. 1 associated with the tag 116 of FIG. 1. As noted earlier, the execution or operation of the address generation module 104 can differ in sequence than the execution or operation of the instruction dispatch module 102 of FIG. 1. In an embodiment, the virtual address generation module 401 does not necessarily execute or operate sequentially or in lock step with the instruction dispatch module 102 relative to the program order 118 of FIG. 1 for the program instructions 114. The flow can progress from the virtual address generation module 401 to the cache line check module 402.

The cache line check module 402 checks to see if a cache line address exists in the prefetch filter 202 of FIG. 2 for the virtual address 120 being generated. The cache line check module 402 can perform the cache line check operation in a number of ways. For example, the virtual address 120 itself can be used to identify a match or not if the virtual address module 206 of FIG. 2, the prefetch filter 202, or a combination thereof is implemented as a content addressable memory architecture or structure. As another example, the cache line check module 402 can perform a sequential read of the valid entries in the virtual address module 206, the prefetch filter 202, or a combination thereof and can compare it to the virtual address 120 to determine a match or not.

If the cache line check module 402 determines that there is a match, then the flow can progress to the drop virtual address module 404. If not, the flow can progress to the virtual address allocation module 408.

The drop virtual address module 404 provides part of the filtering mechanism to filter out repeated or multiple accesses to the same cache-line. In an embodiment, this filtering mechanism enables the prefetch module 112 of FIG. 1 to train on unique cache-line accesses, thereby allowing it to be more efficient by eliminating unnecessary access to other levels of the memory hierarchy. As a specific example, the drop virtual address module 404 can aide in filtering out the virtual addresses 120 that are hits in the cache module 108 of FIG. 1. The drop virtual address module 404 is further described in FIG. 5 as to the function of dropping the virtual address 120 when there is a cache line hit. The flow can progress from the drop virtual address module 404 to the tag deallocation module 406.

The tag deallocation module 406 also provides part of the filtering mechanism to filter out repeated accesses to the same cache-line. In an embodiment, since each virtual address 120 is associated with a particular instance of the tag 116, a program instruction 114, or a combination thereof, the tag 116 associated with the virtual address 120 with a cache hit should also be deallocated or potentially recycled to be used for another program instruction 114.

In an embodiment, the tag 116 associated with the program instruction 114, which is associated with the virtual address 120 to be dropped, is also deallocated from the tag module 204 of FIG. 2. Entries in the tag module 204 are moved such that the relative relationships within the tag module 204 are maintained. The tag module 204 can be collapsed with remaining entries. In the implementation example of a queue for the tag module 204, the entries for the tag 116 above it are shifted. This way the dispatch order or the program order 118 of the program instructions 114 is maintained.

In an example embodiment where the virtual address 120 does not match against an existing cache-line address, then the virtual address allocation module 408 can add or allocate the virtual address 120 to virtual address module 206, the prefetch filter 202, or a combination thereof. In this example, the program instruction 114 and the virtual address 120 is a first instance or not repeated such that the virtual address 120 is not found in the prefetch filter 202. Depending on the implementation of the prefetch filter 202, the virtual address 120 can be allocated into the prefetch filter 202 as the next available entry or location or in any free location. The flow can progress to the tag search module 410.

The tag search module 410 identifies the entry or location matching the value for the tag 116 for the program instruction 114. The tag 116 associated with the virtual address 120 is matched up against entries in the tag module 204 and the corresponding entry in the tag module 204 is identified.

The tag search module 410 can perform the tag matching operation in a number of ways. For example, the tag 116 itself can be used to identify a match in the tag module 204 if the tag module 204 is implemented as a content addressable memory architecture or structure. As another example, the tag search module 410 can perform a sequential read of the valid entries in the tag module 204 to compare the fields containing the tag values to the tag 116 to determine a match. The flow can progress from the tag search module 410 to the pointer module 412.

The pointer module 412 ensures a linkage for the association of the tag 116 with the virtual address 120. For example, the tag 116 in the tag module 204 should maintain its relationship with the associated virtual address 120 in the virtual address module 206.

The pointer module 412 can provide the linkage in a number for ways. For example, pointer module 412 can add the pointer 208 of FIG. 2 to the tag module 204 and associated with the tag 116. The pointer 208 is to identify the location of the virtual address 120 in the virtual address module 206. This establishes a method to link an entry in the tag module 204 to an entry in the virtual address module 206. The pointer 208 ensures that the tag 116 in the tag module 204 remains linked to the virtual address 120 in the virtual address module 206 as the contents of the tag module 204 are moved while the contents in the virtual address module 206 are not moved.

Figure 5:
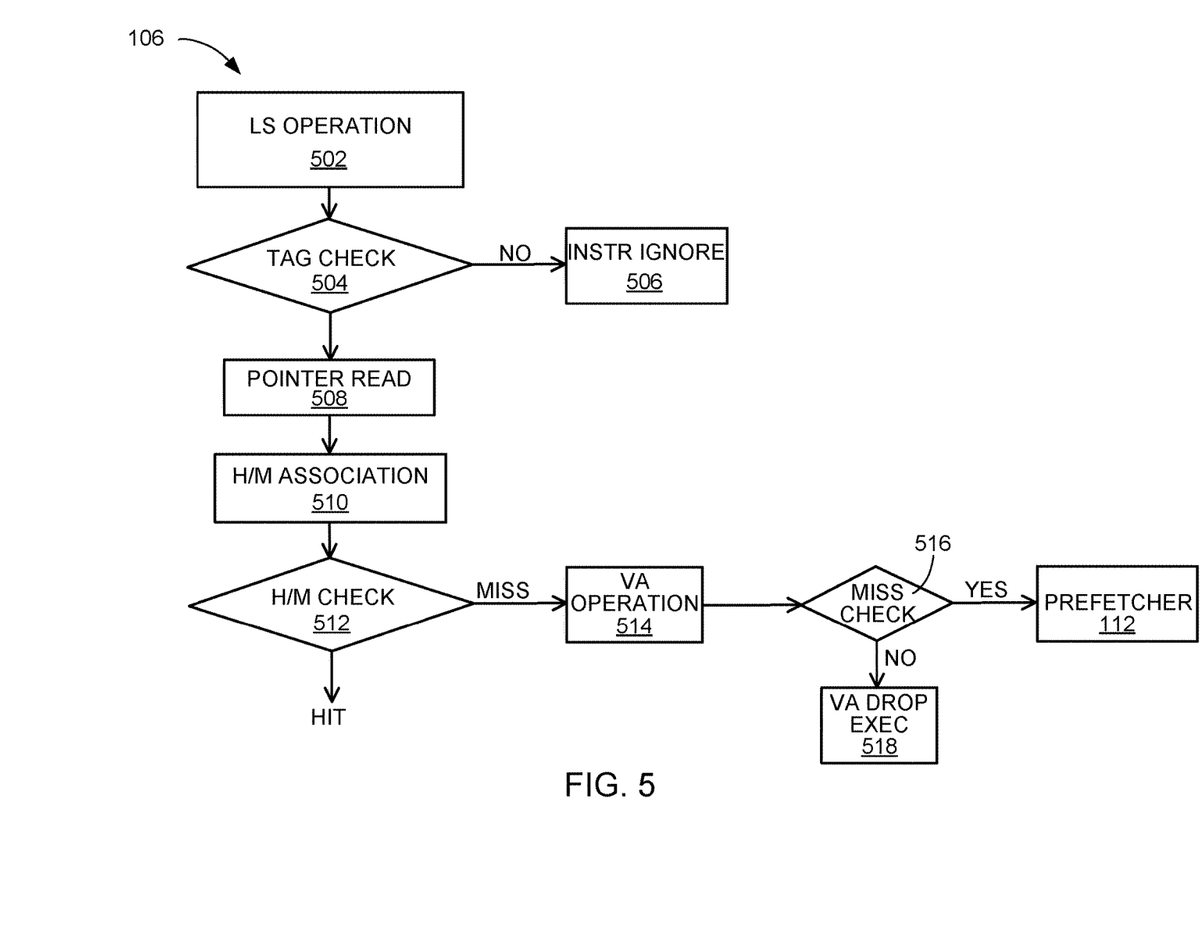
FIG. 5 is a control flow for a load-store execution for the computing system.

Referring now to FIG. 5, there is shown a control flow for a load-store execution for the computing system 100. In an embodiment, FIG. 5 can depict control flow for the load-store execution module 106 of FIG. 1. In an embodiment, the load-store execution module 106 can include a load-store operation module 502, a tag check module 504, an instruction ignore module 506, a pointer read module 508, a hit-miss association module 510, a hit-miss check module 512, a virtual address operation module 514, a miss check module 516, and a virtual address drop execution module 518. The load-store execution module 106 can also interact with the prefetch module 112 of FIG. 1.

The following example embodiment describes when the program instruction 114 is a load instruction for data access. The load-store operation module 502 performs at least a portion of the program instruction 114 of FIG. 1. On execution of the data access instruction, the cache module 108 of FIG. 1 can be checked to see if the cache-line for the data-access exists in the cache module 108.

As described earlier, the cache module 108 can provide the hit-miss status 124 of FIG. 1 to indicate whether the data sought to be accessed by the program instruction 114 is in the cache module 108 as a hit or not in the cache module 108 as a miss. The flow can progress from the load-store operation module 502 to the tag check module 504.

The tag check module 504 determines if the tag 116 is being managed by the address reordering module 110 of FIG. 1. As a specific example for an embodiment, the tag check module 504 determines if the tag 116 is in the tag module 204 of FIG. 2, if the address reordering module 110 is tracking the tag 116, or a combination thereof.

The tag check module 504 can determine if the tag 116 is managed by the address reordering module 110 in a number of ways. In various embodiments, the tag check module 504 checks the tag 116 for the program instruction 114 and can compare the tag 116 to the tag values in the tag module 204. In an embodiment, the tag 116 can be used to see if there is a match in the tag module 204 if the tag module 204 is implemented with a content addressable memory, as similarly described earlier. In a further embodiment, the tag check module 504 can verify if the tag 116 is being managed by a sequential read and compare approach as described earlier.

The flow can progress from the tag check module 504 to the instruction ignore module 506 or to the pointer read module 508. The path to the instruction ignore module 506 can be executed when the address reordering module 110 is not managing the tag 116. The path to the pointer read module 508 can be executed when the address reordering module 110 is managing the tag 116.

The instruction ignore module 506 drops the tag 116 when the program instruction 114 associated with the tag 116 is not managed by the address reordering module 110. The instruction ignore module 506 also does not execute the program instruction 114. In an embodiment, the instruction ignore module 506 can drop the tag 116 in a process similar to that described in the drop tag module 306 of FIG. 3.

The pointer read module 508 allows for the tag 116 found to be associated with the virtual address module 206 of FIG. 2. In an embodiment, the pointer read module 508 extracts the pointer 208 of FIG. 2 from the tag module 204 associated with the entry for the tag 116 managed by the address reordering module 110. As described earlier, the pointer 208 refers to the location for the virtual address 120 in the virtual address module 206 associated with tag 116. The flow can progress from the pointer read module 508 to the hit-miss association module 510.

The hit-miss association module 510 includes the hit-miss status 124 with the virtual address 120 in the virtual address module 206. The hit-miss association module 510 can use the hit-miss status 124 from the cache module 108 for the tag 116 or the program instruction 114 and store or associate it with the virtual address 120 being referenced by the pointer 208. The hit-miss status 124 can be used to populate the hit-miss indicator 212 of FIG. 2 for the virtual address 120 in the virtual address module 206. In other words, a matching entry in the tag module 204 can include or can be marked with the state of the data-cache access of the cache module 108 as a hit or miss via the pointer 208 and the hit-miss indicator 212 associated with the virtual address 120. The flow can progress from the hit-miss association module 510 to the hit-miss check module 512.

The hit-miss check module 512 aides in determining whether the program instruction 114 represented in the tag module 204, the virtual address module 206, or a combination thereof should be prefetched or be used to train the prefetch module 112. In an embodiment, the hit-miss check module 512 traverses the tag module 204 starting at an end with the oldest program instruction 114.

In an embodiment, the hit-miss check module 512 utilizes the pointer 208 to identify the location of the virtual address 120 in the virtual address module 206. The hit-miss check module 512 can extract the hit-miss indicator 212 for that location associated with the virtual address 120. If the hit-miss indicator 212 indicates a hit for the program instruction 114 via the tag 116, the pointer 208, the virtual address 120, or a combination thereof, then that information is sent to the prefetch module 112 and can be used for training the prefetch module 112. If the hit-miss check module 512 indicates a miss for the program instruction 114 via the hit-miss indicator 212 for the virtual address 120 associated with that program instruction 114, then the flow can progress from the hit-miss check module 512 to the virtual address operation module 514.

The virtual address operation module 514 aides in the determination of whether the virtual address 120 should be sent to the prefetch module 112 or does not need to be sent to the prefetch module 112. The virtual address operation module 514 extracts the virtual address 120 from the virtual address module 206 based on the oldest program instruction 114 associated with the tag 116 at the end of the tag module 204. The pointer 208 associated with that tag 116 refers to or provides the location of an entry in the virtual address module 206 and the virtual address 120 that is then extracted by the virtual address operation module 514.

The hit-miss indicator 212 can also be associated with the virtual address 120 that has been extracted. The hit-miss indicator 212 will be used further, along with the virtual address 120, for determining whether to send the virtual address 120 to the prefetch module 112 or not. The tag 116 and the virtual address 120 with the associated pointer 208 and hit-miss indicator 212, respectively, are ready to be deallocated from the tag module 204 and the virtual address module 206, also respectively. The flow can progress from the virtual address operation module 514 to the miss check module 516.

The miss check module 516 aides in the determination of what action should be taken for a particular virtual address 120 that was extracted. In an embodiment, the miss check module 516 utilizes the hit-miss indicator 212 associated with the virtual address 120. If the hit-miss indicator 212 provides that the virtual address 120 is a miss in the cache module 108, then that virtual address 120 is sent to the prefetch module 112. If the hit-miss indicator 212 provides that the virtual address 120 is a hit in the cache module 108, then the flow progresses to the virtual address drop execution module 518.

The virtual address drop execution module 518 deallocates the information for the program instruction 114 from the address reordering module 110. In an embodiment, the virtual address drop execution module 518 can deallocate the tag 116 and the pointer 208 from the tag module 204. The virtual address drop execution module 518 can also collapse the remaining entries in the tag module 204 so as to maintain the relative order of the entries to one another per the program order 118, as described earlier.

Also in an embodiment, the virtual address drop execution module 518 can deallocate the virtual address 120 and the hit-miss indicator 212, from the virtual address module 206. In this example, the virtual address module 206 is nonshifting. Unlike the tag module 204 being collapsed after deallocation of the tag 116 or shifting, the virtual address module 206 is not collapsed nor are the entries in the virtual address module 206 moved to different locations in the virtual address module 206. This allows the remaining tag 116 and associated pointer 208 to accurately refer to the correct location for the associated virtual address 120 in the virtual address module 206.

It has been discovered that the computing system 100 provides the ability to reconstruct the virtual addresses 120 for the program instructions 114 in program order 118, even during out-of-order execution. Each program instruction 114 is associated with a unique tag 116 and the pointer 208 relates a specific tag 116 to a location or entry for the virtual address 120 associate with that specific program instruction 114, the specific tag 116, or a combination thereof. The tags 116 are in program order 118, allowing any virtual address 120 delivered to the prefetch module 112 to be reconstructed so as to be in program order 118.

It has been further discovered that the computing system 100 filters out the virtual addresses 120 that are hits in the cache module 108. The hit-miss statuses 124 from the cache module 108 are stored as the hit-miss indicators 212 with the virtual address 120 for a particular program instruction 114, or as a more specific example, a data load or memory access instruction. If the hit-miss indicator 212 provides a hit status, then the virtual address 120 associated with the hit is not sent to the prefetch module 112, and various embodiments can deallocate information for that particular virtual address 120.

It has been yet further discovered that the computing system 100 incorporates a mechanism to filter out hits in the cache module 108 from training the prefetch module 112 and to enable the prefetch module 112 to sample the misses in the program order 118. This is accomplished, in an embodiment, with the hit-miss indicator 212 for the virtual address 120, as described above.

The computing system 100 has been described with modular functions and orders thereof as an example. The computing system 100 can partition the modules differently or order the modules differently. For example, the instruction dispatch module 102 and the address generation module 104 can be integrated into a single module and the circuitry can be shared between them. Further as an example, the tag module 204 and the virtual address module 206 can be implemented using a single memory structure or device or be managed differently by various embodiments such that a portion of that memory is reserved for tags 116 and another non-overlapping portion is reserved for the virtual addresses 120.

The modules described in this application can be hardware implementations or hardware accelerators in the computing system 100. The modules can also be hardware implementation or hardware accelerators within the computing system 100 or external to the computing system 100.

The modules described in this application can be implemented as instructions stored on a non-transitory computer readable medium to be executed by the computing system 100. The non-transitory computer medium can include memory internal to or external to the computing system 100. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the computing system 100 or installed as a removable portion of the computing system 100.

Figure 6:
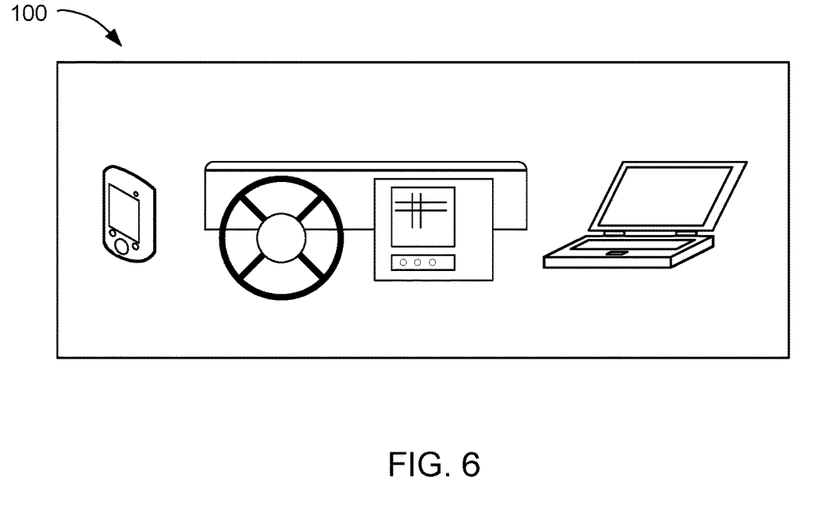
FIG. 6 is examples of the computing system as application examples with the embodiment of the present invention.

Referring now to FIG. 6, FIG. 6 depicts various example embodiments for the use of the computing system 100, such as in a smart phone, the dash board of an automobile, and a notebook computer.

These application examples illustrate the importance of the various embodiments of the present invention to provide improved processing performance while minimizing power consumption by reducing unnecessary interactions requiring more power. In an example where an embodiment of the present invention is an integrated circuit processor and the cache module 108 is embedded in the processor, then accessing the information or data off chip requires more power than reading the information or data on-chip from the cache module 108. Various embodiments of the present invention can filter unnecessary prefetch or off-chip access to reduce the amount of power consumed while still prefetching what is needed, e.g. misses in the cache module 108, for improved performance of the processor.

The computing system 100, such as the smart phone, the dash board, and the notebook computer, can include one or more of a subsystem (not shown), such as a printed circuit board having various embodiments of the present invention or an electronic assembly having various embodiments of the present invention. The computing system 100 can also be implemented as an adapter card.

Figure 7:
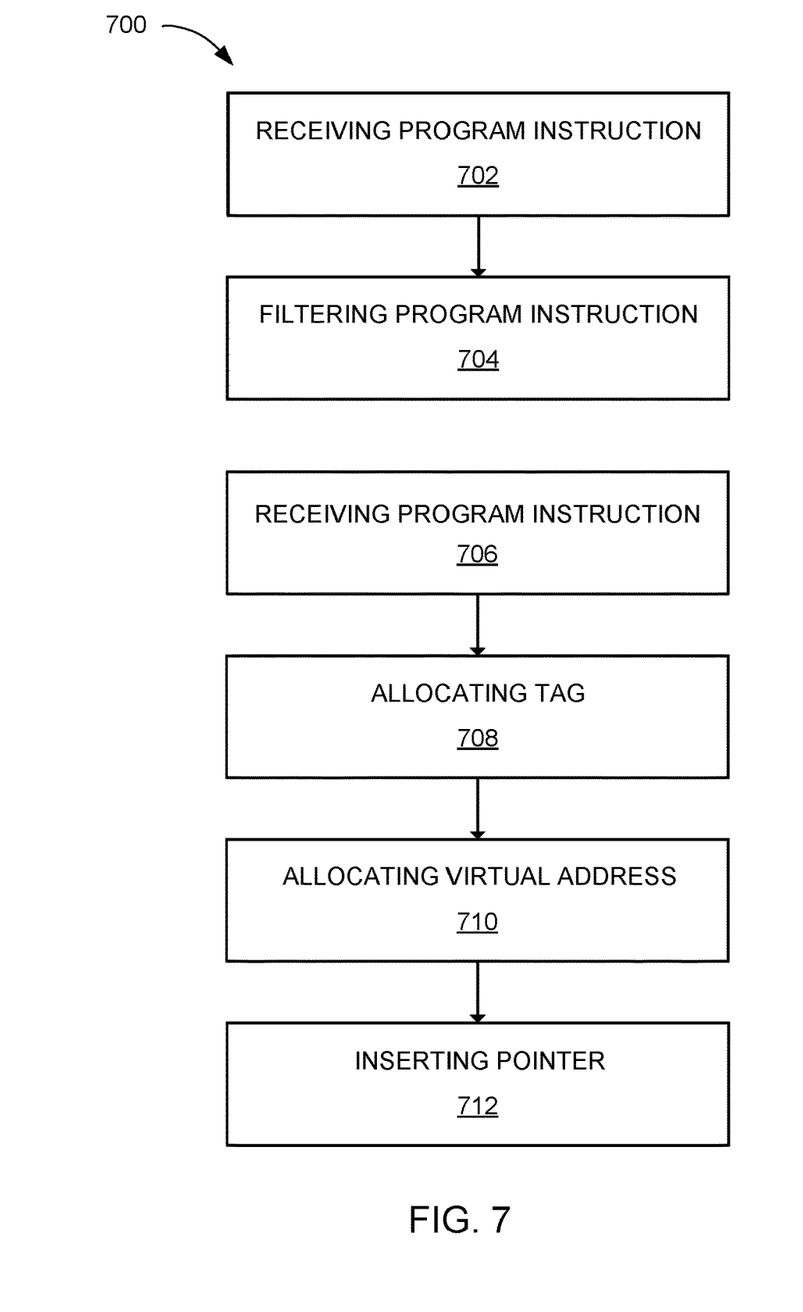
FIG. 7 is a flow chart of a method of operation of a computing system in an embodiment of the present invention.

Referring now to FIG. 7, therein is shown a flow chart of a method 700 of operation of a computing system 100 in an embodiment of the present invention. The method 700 includes: receiving a program instruction in a block 702; and filtering the program instruction when the program instruction is a hit in a cache-line in a prefetch filter in a block 704. The method 700 further includes receiving a program instruction in a block 706; allocating a tag in a tag module for the program instruction in a program order in a block 708; allocating a virtual address in a virtual address module for the program instruction in an out-of-order relative to the program order in a block 710; and inserting a pointer associated with the tag to link the tag to the virtual address in a block 712.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:
1. A computing system comprising:
an instruction dispatch module configured to:
  receive a program instruction,
  allocate the program instruction in a program order,
  generate a tag for the program instruction,
  allocate the tag in the program order in a tag module;
an address reordering module, coupled to the instruction dispatch module, configured to:
  allocate a virtual address into a virtual address module out-of-order relative to the program order,
  insert a pointer associated with the tag to link the tag to the virtual address, and
  filter the program instruction when the program instruction has accessed the virtual address for a cache-line in a prefetch filter.

2. The system as claimed in claim 1 further comprising:
an address generation module, coupled to the address reordering module, configured to generate the virtual address for the program instruction; and
wherein the address reordering module is further configured to:
match the virtual address with the cache-line in the prefetch filter.

3. The system as claimed in claim 1 further comprising:
an address generation module, coupled to the address reordering module, configured to generate the virtual address for the program instruction; and
wherein the address reordering module is further configured to:
insert the virtual address into the prefetch filter when the program instruction is not a repeat.

4. The system as claimed in claim 1 wherein:
the instruction dispatch module is further configured to:
generate the tag for the program instruction,
allocate the tag in the program order in the tag module; and
the address reordering module is further configured to:
deallocate the tag from the tag module when the program instruction is repeated for prefetching.

5. The system as claimed in claim 1 further comprising an address generation module, coupled to the address reordering module, configured to generate the virtual address for the program instruction.

6. A computing system comprising:
an instruction dispatch module configured to:
receive a program instruction;
an address reordering module, coupled to the instruction dispatch module, configured to:
allocate a tag in a tag module for the program instruction in a program order,
allocate a virtual address in a virtual address module for the program instruction and out-of-order relative to the program order,
insert a pointer associated with the tag to link the tag to the virtual address,
deallocate the tag from the tag module when the program instruction is repeated for prefetching, and
collapse the tag module to maintain a relative order in the program order.

7. The system as claimed in claim 6 further comprising a load-store execution module, coupled to the instruction dispatch module, configured to:
extract a hit-miss indicator for the virtual address; and
send the virtual address for prefetching when the hit-miss indicator is determined to be a miss.

8. The system as claimed in claim 6 further comprising a load-store execution module, coupled to the instruction dispatch module, configured to:
extract a hit-miss indicator for the virtual address; and
deallocate the virtual address from the virtual address module when the hit-miss indicator is determined to be a hit.

9. The system as claimed in claim 6 further comprising a load-store execution module, coupled to the instruction dispatch module, configured to not collapsing the virtual address module.

10. A method of operation of a computing system comprising:
receiving a program instruction;
allocating the program instruction in a program order;
filtering the program instruction when the program instruction has accessed a virtual address for a cache-line in a prefetch filter,
generating a tag for the program instruction:
allocating the tag in the program order in a tag module;
generating the virtual address for the program instruction;
allocating the virtual address into a virtual address module out-of-order relative to the program order; and
inserting a pointer associated with the tag to link the tag to the virtual address.

11. The method as claimed in claim 10 further comprising:
generating the virtual address for the program instruction; and
wherein filtering the program instruction includes:
matching the virtual address with the cache-line in the prefetch filter.

12. The method as claimed in claim 10 further comprising:
generating the virtual address for the program instruction; and
inserting the virtual address into the prefetch filter when the program instruction is not the repeat.

13. The method as claimed in claim 10 further comprising deallocating the tag from the tag module when the program instruction is repeated for prefetching.

14. A method of operation of a computing system comprising:
receiving a program instruction;
allocating a tag in a tag module for the program instruction in a program order;
allocating a virtual address in a virtual address module for the program instruction and out-of-order relative to the program order;
inserting a pointer associated with the tag to link the tag to the virtual address; and
filtering the program instruction when the program instruction has accessed the virtual address for a cache-line in a prefetch filter.

15. The method as claimed in claim 14 further comprising:
deallocating the tag from the tag module when the program instruction is repeated for prefetching; and
collapsing the tag module to maintain a relative order to the program order.

16. The method as claimed in claim 14 further comprising:
extracting a hit-miss indicator for the virtual address; and
sending the virtual address for prefetching when the hit-miss indicator is determined to be a miss.

17. The method as claimed in claim 14 further comprising:
extracting a hit-miss indicator for the virtual address; and
deallocating the virtual address from the virtual address module when the hit-miss indicator is determined to be a hit.

18. The method as claimed in claim 17 wherein deallocating the virtual address from the virtual address module includes not collapsing the virtual address module.

* * * * *